US007614950B2

(12) United States Patent
Rothkranz

(10) Patent No.: US 7,614,950 B2
(45) Date of Patent: Nov. 10, 2009

(54) GAMING DEVICE HAVING ROTATABLE TUBULAR AWARD INDICATORS

(75) Inventor: Markus Rothkranz, Las Vegas, NV (US)

(73) Assignee: IGT, Reno, NV (US)

(*) Notice: Subject to any disclaimer, the term of this patent is extended or adjusted under 35 U.S.C. 154(b) by 532 days.

(21) Appl. No.: 10/364,216

(22) Filed: Feb. 10, 2003

(65) Prior Publication Data

US 2004/0157658 A1 Aug. 12, 2004

(51) Int. Cl.
*A63F 13/00* (2006.01)

(52) U.S. Cl. ............................ 463/20; 463/46; 21/386; 21/397; 21/374

(58) Field of Classification Search ..................... 463/9, 463/10, 16-20, 46, 1; D21/322-325, 369-397, D21/503, 814

See application file for complete search history.

(56) References Cited

U.S. PATENT DOCUMENTS

| | | | | |
|---|---|---|---|---|
| 2,545,644 | A | 3/1951 | Benton et al. | |
| 3,795,022 | A | 8/1976 | Figueroa | 5/181 |
| 4,410,178 | A | 10/1983 | Partridge | |
| 4,695,053 | A | 9/1987 | Vazquez, Jr. et al. | |
| 4,732,386 | A | 3/1988 | Rayfiel | |
| 4,765,078 | A * | 8/1988 | Yamamoto | 40/309 |
| 5,152,529 | A | 10/1992 | Okada | |
| 5,364,100 | A | 11/1994 | Ludlow et al. | |
| 5,395,111 | A | 3/1995 | Inoue | |
| 5,449,173 | A | 9/1995 | Thomas et al. | |
| 5,560,603 | A | 10/1996 | Seelig et al. | |
| 5,584,763 | A | 12/1996 | Kelly et al. | |
| 5,609,524 | A | 3/1997 | Inoue | |
| 5,664,998 | A | 9/1997 | Seelig et al. | |
| 5,752,881 | A * | 5/1998 | Inoue | 463/20 |
| 5,823,872 | A | 10/1998 | Prather et al. | |
| 5,823,874 | A | 10/1998 | Adams et al. | |
| D400,597 | S | 11/1998 | Hedrick et al. | |

(Continued)

FOREIGN PATENT DOCUMENTS

| | | |
|---|---|---|
| GB | 912685 | 12/1962 |

(Continued)

OTHER PUBLICATIONS

4DU Dice Unit Advertisement written by starpoint.uk.com, printed on Sep. 3, 2002.

(Continued)

*Primary Examiner*—Ronald Laneau
*Assistant Examiner*—Ross A. Williams
(74) *Attorney, Agent, or Firm*—K&L Gates LLP

(57) ABSTRACT

A gaming device including an apparatus and method for indicating awards in a game, and specifically to an apparatus and method employing tubular rotatable award indicators. In one embodiment, the apparatus of the present invention includes a cabinet, a housing connected to the cabinet, a support connected to the housing, a tubular member connected to the support and including at least one award symbol and a processor which causes the tubular member to move and reveal the award symbol on the tubular member when an award triggering event occurs in a game. In another embodiment, the apparatus includes a plurality of tubular members connected to the support. The tubular members include a plurality of award symbols wherein a different award symbol is included on each tubular member.

31 Claims, 5 Drawing Sheets

U.S. PATENT DOCUMENTS

| | | | | |
|---|---|---|---|---|
| D402,702 | S | 12/1998 | Seelig et al. | |
| 5,848,932 | A | 12/1998 | Adams | |
| D406,865 | S | 3/1999 | Heidel | |
| 5,882,261 | A | 3/1999 | Adams | |
| 5,911,418 | A | 6/1999 | Adams et al. | |
| 5,927,714 | A | 7/1999 | Kaplan | |
| 5,976,015 | A | 11/1999 | Seelig et al. | |
| 5,984,782 | A * | 11/1999 | Inoue | 463/20 |
| 6,004,207 | A | 12/1999 | Wilson, Jr. et al. | |
| 6,059,658 | A | 5/2000 | Mangano et al. | |
| 6,086,066 | A | 7/2000 | Takeuchi et al. | |
| 6,089,977 | A | 7/2000 | Bennett | |
| 6,089,978 | A | 7/2000 | Adams et al. | |
| 6,105,962 | A | 8/2000 | Malavazos et al. | |
| 6,113,098 | A | 9/2000 | Adams | |
| 6,142,873 | A | 11/2000 | Weiss et al. | |
| 6,142,874 | A | 11/2000 | Kodachi et al. | |
| 6,159,098 | A | 12/2000 | Slomiany et al. | |
| 6,162,121 | A | 12/2000 | Morro et al. | |
| 6,165,070 | A * | 12/2000 | Nolte et al. | 463/20 |
| 6,173,955 | B1 | 1/2001 | Perrie et al. | |
| 6,203,429 | B1 | 3/2001 | Demar et al. | |
| D441,031 | S | 4/2001 | Seelig et al. | |
| 6,213,876 | B1 | 4/2001 | Moore, Jr. | |
| 6,220,593 | B1 | 4/2001 | Pierce et al. | |
| 6,224,483 | B1 | 5/2001 | Mayeroff | |
| 6,227,970 | B1 | 5/2001 | Shimizu et al. | |
| D443,313 | S | 6/2001 | Brettschneider | |
| 6,251,013 | B1 | 6/2001 | Bennett | |
| 6,254,481 | B1 | 7/2001 | Jaffe | |
| 6,267,669 | B1 | 7/2001 | Luciano, Jr. et al. | |
| 6,270,411 | B1 | 8/2001 | Gura et al. | |
| 6,302,790 | B1 | 10/2001 | Brossard | |
| 6,305,686 | B1 | 10/2001 | Perrie et al. | |
| 6,315,663 | B1 | 11/2001 | Sakamoto | |
| 6,336,863 | B1 | 1/2002 | Baerlocher et al. | |
| 6,340,158 | B2 | 1/2002 | Pierce et al. | |
| 6,368,216 | B1 | 4/2002 | Hedrick et al. | |
| 6,386,974 | B1 | 5/2002 | Adams | |
| 6,398,220 | B1 | 6/2002 | Inoue | |
| 6,419,579 | B1 | 7/2002 | Bennett | |
| 6,461,241 | B1 | 10/2002 | Webb et al. | |
| D465,531 | S | 11/2002 | Luciano, Jr. et al. | |
| 6,481,713 | B2 | 11/2002 | Perrie et al. | |
| 6,533,660 | B2 | 3/2003 | Seelig et al. | |
| 6,537,152 | B2 | 3/2003 | Seelig et al. | |
| 6,582,307 | B2 | 6/2003 | Webb | |
| 6,609,972 | B2 | 8/2003 | Seelig et al. | |
| 6,644,663 | B2 * | 11/2003 | Seelig et al. | 273/143 R |
| 6,712,694 | B1 | 3/2004 | Nordman | 465/20 |

FOREIGN PATENT DOCUMENTS

| | | | | |
|---|---|---|---|---|
| JP | 06039085 | A | * | 2/1994 |
| JP | 08052254 | A | * | 2/1996 |
| JP | 2002126160 | A | * | 5/2002 |
| JP | 2005130872 | A | * | 5/2005 |

OTHER PUBLICATIONS

American Bandstand Brochure written by Anchor Games, published in 2001.
Big Shot!™ Advertisement published by Aristocrat Technologies, Inc., published in 2002.
Big Top Keno Advertisement published by Aristocrat Technologies, Inc., published in 2000.
Bonus Roulette Brochure written by F. Franco, not dated.
Buck's Roulette Brochure written by R. Franco, not dated.
Chariot's of Fortune Brochure written by R. Franco, not dated.
Classic Pot of Gold Brochure written by Ace Coin Equipment Ltd., not dated.
Cyberdyne Gaming Brochure written by Cyberdyne Gaming, not dated.
Elvira® Mistress of the Dark™ Advertisement written by IGT, published in 2002.
Elvis Hits Advertisement written by IGT, published in 1999.
Holy Smoke Brochure written by Impulse Gaming Ltd., not dated.
Jack and the Beanstalk™ Brochure written by AC Coin & Slot, not dated.
King of the Grill™ Brochure written by AC Coin & Slot, not dated.
Line-Up Brochure written by AC Coin & Slot, not dated.
Little Green Men Jr.™ Advertisement written by AC Coin & Slot, not dated.
Little Green Men Jr.™ Article written by Strictly Slots, published in Feb. 2003.
Miss America Brochure written by AC Coin & Slot, not dated.
Mix and Match Article written by Strictly Slots, published in Apr. 2002.
Mix and Match Advertisement published by AC Coin & Slot, not dated.
Money Grab Article written by Strictly Slots, published in Apr. 2001.
Monster Match Article written by Strictly Slots, published in Jan. 2002.
On The Money! Article written by Strictly Slots, published in Dec. 2000.
Payout!™ Advertisement written by www.csds.com/Gaming/Products/g Payout.htm, printed on Jan. 15, 2001.
Payout!™ Article written by Casino Data Systems, not dated.
Pick a Prize Brochure written by Acres Gaming Incorporated, published prior 2001.
Power Slotto Brochure published by AC Coin & Slot prior to 2002.
Press Your Luck Brochure published by AC Coin & Slot prior to 2002.
Quick Pick Paytime Brochure written by Acres Gaming Incorporated, published prior to 2001.
R&B™ Brochure published by AC Coin & Slot, not dated.
Reel Dice Advertisement written by Gerber & Glass, published in 1936.
Royal Roulette Brochure written by Impulse Gaming Ltd., not dated.
Slot Machine Buyer's Handbook, A Consumer's Guide to Slot Machines written by David L. Saul and Daniel R. Mead, published in 1998.
Silver City Roundup Brochure published by AC Coin & Slot, not dated.
Slot Machines A Pictorial History of the First 100 Years, 5th edition written by Marshall Fey, published in 1983-1997.
Slot Machines on Parade, 1st edition written by Robert N. Geddes and illustrated by Daniel R. Mead, published in 1980.
Spin-A-Lot Brochure written by Acres Gaming Incorporated, published prior to 2001.
Take Your Pick Article written by Strictly Slots, published in Mar. 2001.
Yahtzee Bonus Advertisement written by Mikohn, published in 1999.

* cited by examiner

GAMING DEVICE HAVING ROTATABLE TUBULAR AWARD INDICATORS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly to a gaming device including rotatable award indicators.

Gaming device manufacturers strive to make gaming devices such as slot machines and video poker machines that provide as much enjoyment, entertainment and excitement as possible to players. Providing interesting and exciting primary games and secondary games in which a player has an opportunity to win potentially large awards or credits is one way to enhance player enjoyment and excitement. Another way to enhance a player's enjoyment, entertainment and excitement with a gaming device is by including lights, sounds or other visual or audio or audio-visual effects in the gaming machines.

Some known gaming devices use mechanical devices such as reels or wheels to enhance the attraction of the machines to players and also to enhance the player's game playing experience. These mechanical devices enable a player to see and play a physical representation of a game or a portion of a game, which increases the player's enjoyment of the game.

Therefore, to increase player enjoyment and excitement, it is desirable to provide new and different mechanical devices in conjunction with gaming devices.

SUMMARY OF THE INVENTION

The present invention provides a gaming device having an apparatus and method for revealing awards or indicating symbols such as awards to a player. Specifically, the gaming device includes an apparatus having rotatable elongated tubular symbol or award indicators.

One embodiment of the apparatus of the present invention includes a symbol or award indicator display including a housing which is secured to the top of the cabinet of the gaming device and a support that is positioned inside the housing and mounted on the cabinet or inside the housing. The support includes at least one channel and preferably a plurality of channels. In one embodiment, the channels are molded or integrally formed in the support. In another embodiment, the channels are separate components which are attached to the structure of the support. One or more elongated tubular members are positioned in the channels on the support and are movably connected to the support. Specifically, in one embodiment, a support arm is attached between one end of the tubular member and a motor connected to the support. In another embodiment, a support arm is connected between each end of the tubular members and the support. In this embodiment, one of the tubular members is connected to the motor on the support. The motors may be any suitable motors and rotate the support arms which in turn, rotate the tubular members.

In one embodiment, plurality of symbols such as award symbols are included on the tubular members to indicate awards to a player. The symbols may be award symbols, game elements or game symbols or any other suitable symbols. In one embodiment, each tubular member includes a different award symbol. In another embodiment, each tubular member includes a plurality of different award symbols. In this embodiment, each tubular member moves or rotates incrementally to reveal a particular award on the tubular member. In a further embodiment, at least one of the tubular members includes a plurality of relatively large awards. It should be appreciated that the tubular members may rotate incrementally, simultaneously, sequentially or any combination thereof to reveal symbols in a game.

In another embodiment, a selector is associated with each of the tubular members. The player activates the selector to select one or more of the tubular members. The gaming device then provides the player with the symbol or symbols associated with the tubular member or members picked by the player. In such embodiment, the symbols on the tubular members may vary or change.

It should be appreciated that the rotatable award indicators of the present invention may be employed in a primary or base game or in a secondary or bonus game.

It is therefore an advantage of the present invention to provide a gaming device having unique award indicators to indicate awards to players.

A further advantage of the present invention is to provide a gaming device having physical award indicators that present new visual stimuli to players.

Other objects, features and advantages of the present invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
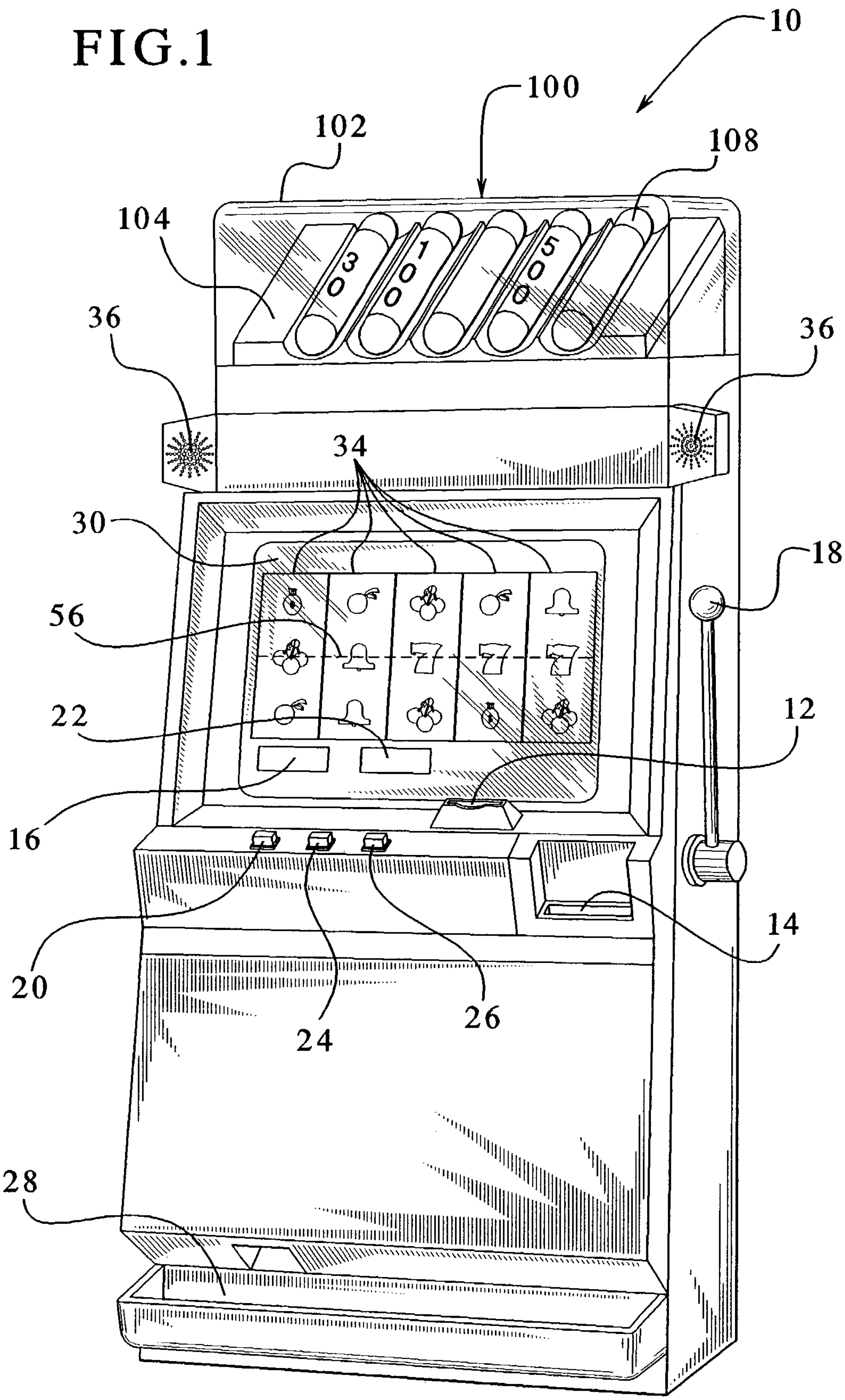
FIG. 1 is a front perspective view of one embodiment of the gaming device of the present invention.
Figure 1B:
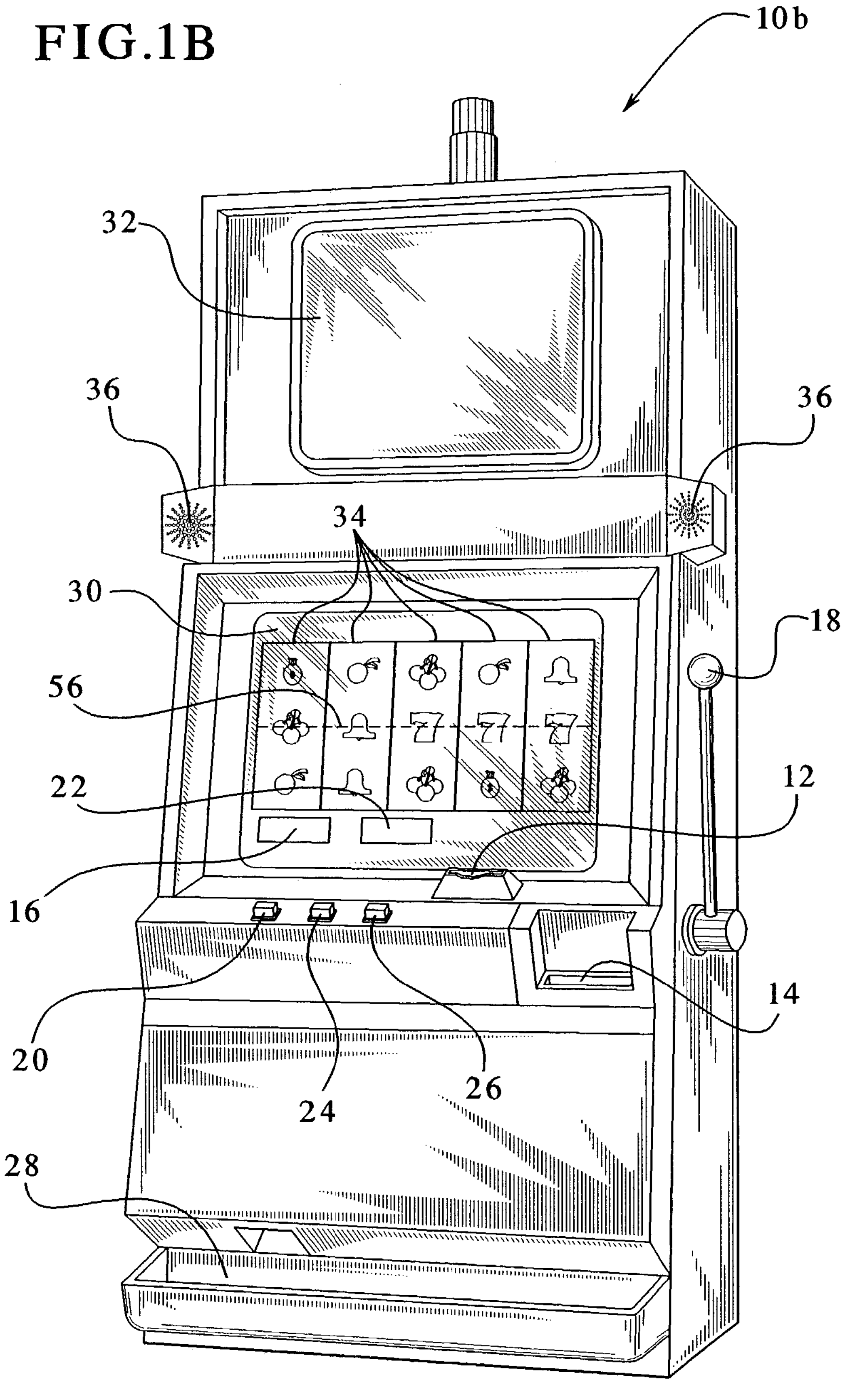
FIG. 1B is a front perspective view of one embodiment of the gaming device of the present invention.

Referring now to the drawings, one embodiment of the gaming device of the present invention is illustrated in FIG. 1 as gaming device 10. Gaming device 10 is in one embodiment, a slot machine having the controls, displays and features of a conventional slot machine. It is constructed so that a player can operate it while standing or sitting, and gaming device 10 is preferably mounted on a console in a cabinet. However, it should be appreciated that gaming device 10 can be constructed as a pub-style table-top game (not shown) which a player can operate preferably while sifting. Furthermore, gaming device 10 can be constructed with varying cabinet and display designs, as illustrated by the design shown in FIG. 1.

Gaming device 10 can incorporate any suitable primary game such as slot, poker, blackjack or keno, any of the bonus triggering events and any of the bonus round games associated with these primary games. The symbols and indicia used on and in gaming device 10 may be in mechanical, electrical, electronic or video form.

As illustrated in FIG. 1, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player who starts any game or sequence of events in the gaming device.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. The gaming device may also include conventional "bet max" and "repeat the bet" buttons.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1 includes a central display device 30 and an indicator display 100. Gaming device 10 may display a plurality of reels 34, such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10.

Figure 2:
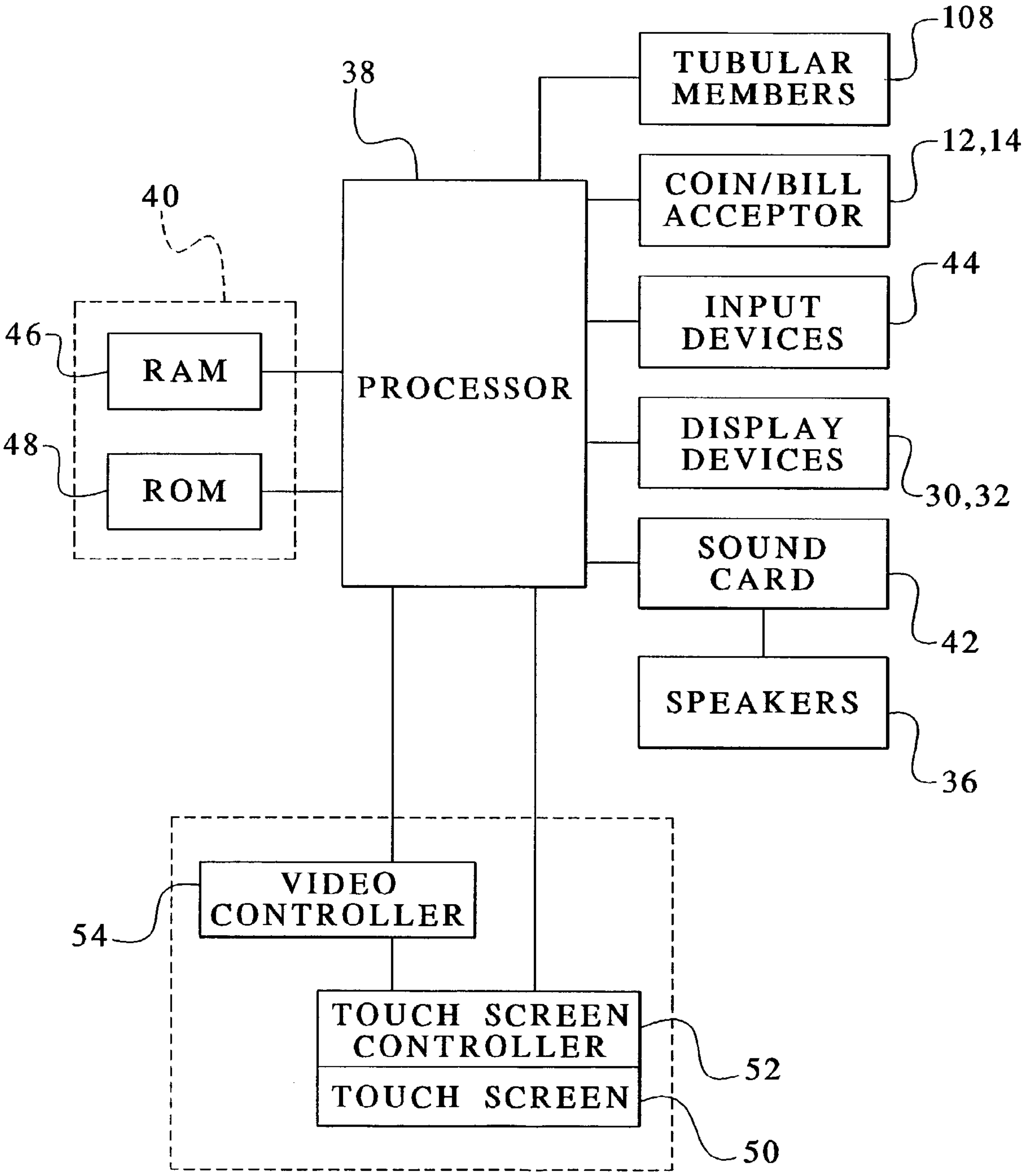
FIG. 2 is a schematic block diagram of the electronic configuration of one embodiment of the gaming device of the present invention.
Figure 3:
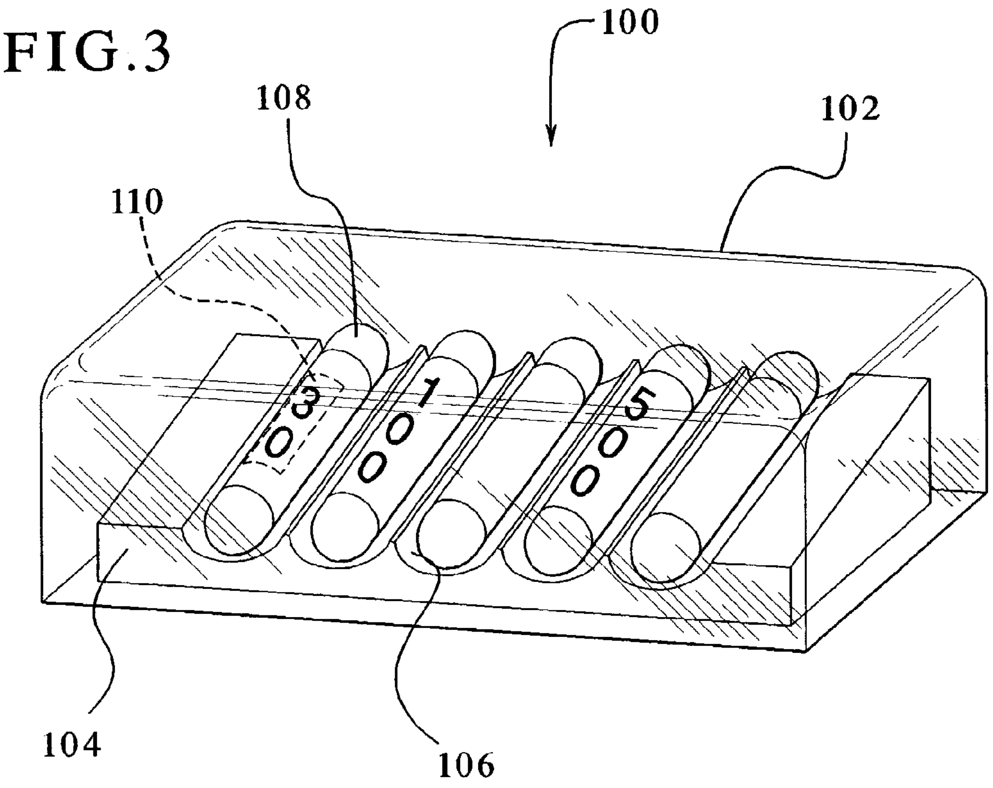
FIG. 3 is an enlarged perspective view of one embodiment of the present invention.
Figure 4:
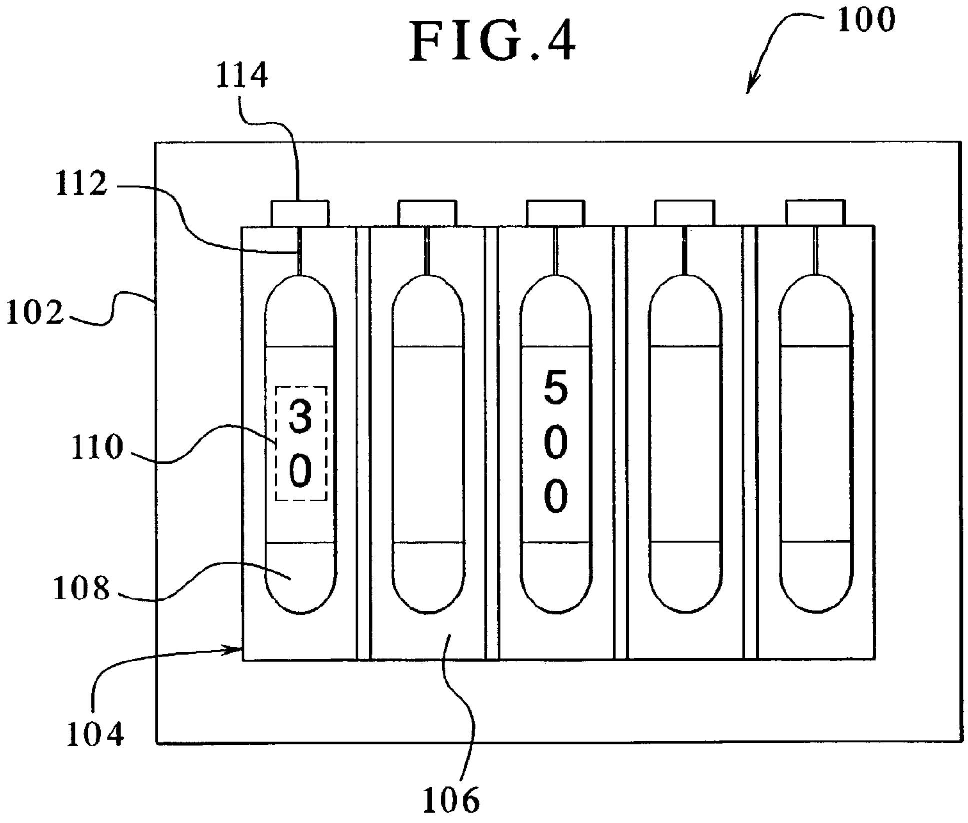
FIG. 4 is a top plan view of the embodiment shown in FIG. 3.

As illustrated in FIG. 2, the general electronic configuration of gaming device 10 preferably includes: a processor 38; a memory device 40 for storing program code or other data; a central display device 30; an upper display device 32; tubular members 108; a sound card 42; a plurality of speakers 36 for making sounds or playing music; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1 and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round or bonus game. This type of gaming device 10 will include a program which will automatically begin a bonus round when the player has achieved a qualifying condition in the game. This qualifying condition can be a particular arrangement of indicia on a display device. The qualifying condition preferably is a predetermined combination of indicia appearing on a plurality of reels 34. As illustrated in the five reel slot game shown in FIG. 1, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Rotatable Tubular Award Indicators

The present invention provides a gaming device and more specifically, a gaming device including rotatable elongated tubular symbol or award indicators. In one embodiment the elongated tubular member is open at both ends. In another embodiment, the elongated tubular member is open at one end and closed at the opposite end. In another embodiment, the elongated tubular member is closed at both opposite ends and is rotated by an exterior rotating device or actuator.

Referring to FIG. 1, one embodiment of the present invention includes a gaming device 10 having an indicator display 100 mounted on the top portion of the cabinet of the gaming device 10. In this embodiment, the indicator display includes a cabinet, a housing 102 that is attached to the top portion of the cabinet of the gaming device. However, it should be appreciated that the housing 102 may be a separate component removably attached to the cabinet of the gaming device 10. In one embodiment, the housing 102 is made of a transparent material that enables a player to see through at least a portion of the housing. The housing may be secured to the gaming device using suitable fasteners or in any suitable manner.

A support 104 is positioned inside the housing and mounted on the top portion of the cabinet of the gaming device 10 or to the bottom portion of the housing 102. The support 104 defines a plurality of elongated channels 106 with concave surfaces. In one embodiment, the support and channels are integrally formed. It should be appreciated that the support may be manufactured using any suitable material. The support 104 may define one channel 106 or a plurality of channels. In this embodiment, a plurality of channels are formed in and arranged adjacent to each other in the support. It should be appreciated that the channels may be positioned in any position on the support as desired by the game implementor.

In one embodiment, a tubular member 108 is positioned in each of the channels on the support 104. The tubular members are formed using a suitable material. In one embodiment, the tubular members 108 are connected to support arms 112 which in turn are connected to actuators such as motors 114. The motors 114 are powered by a suitable power source such as electricity. The motors move or rotate the support arms 112. As the support arm 112 moves or rotates, the tubular member 108 moves and rotates at the same rate. The support arms 122 and the tubular members 108 may rotate in any desired direction or any combination of directions. In another embodiment, support arms 112 are connected to both ends of each tubular member 108. In this embodiment, one support arm 112 is connected between an end of each tubular member 108 and the support. Another support arm 112 is connected between the other end of the tubular member and a motor as described above.

In one preferred embodiment, a plurality of symbols such as award symbols 110 are formed on or attached to the tubular members 108. In one embodiment, the tubular members 108 each include a different award symbol 110. In a game, the processor communicates with the motor 114 to rotate one or more of the tubular members 108 to reveal the a symbol such as an award symbol 110 on one or more of the tubular members. The award symbol 110 may represent awards, values, credits, free spins, free games or any other type of award as desired by the game implementor. It should also be appreciated that the award indicators may include other symbols such as game elements which function in the primary or secondary game.

In another embodiment, the tubular members 108 include a plurality of award symbols 110. In this embodiment, each tubular member 108 includes several different award symbols 110. The processor communicates with the motors 114 to rotate the arms 112 and thereby rotate the tubular members 108. It should be appreciated that the tubular members may randomly rotate or rotate simultaneously, sequentially or any combination therein. In one embodiment, at least one of the tubular members 108 includes several relatively large awards. The processor communicates with the motors 114 to rotate the arms 112 and thereby rotate the tubular members 108 to reveal one or more award symbols to the player in a game. The award symbols 110 are revealed based on an award triggering event or events that occur in a game.

Figure 5A:
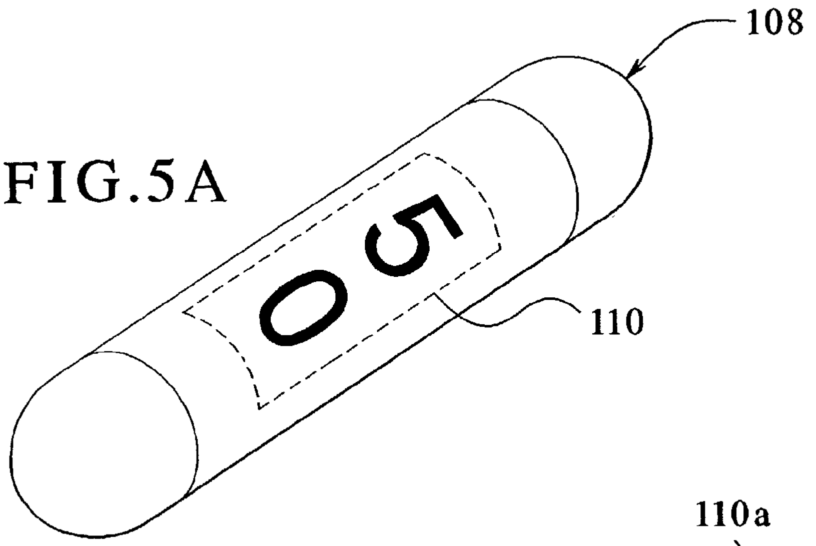
FIG. 5A is an enlarged perspective view of the award indicator of one embodiment of the present invention where the award indicator includes one award symbol.
Figure 5B:
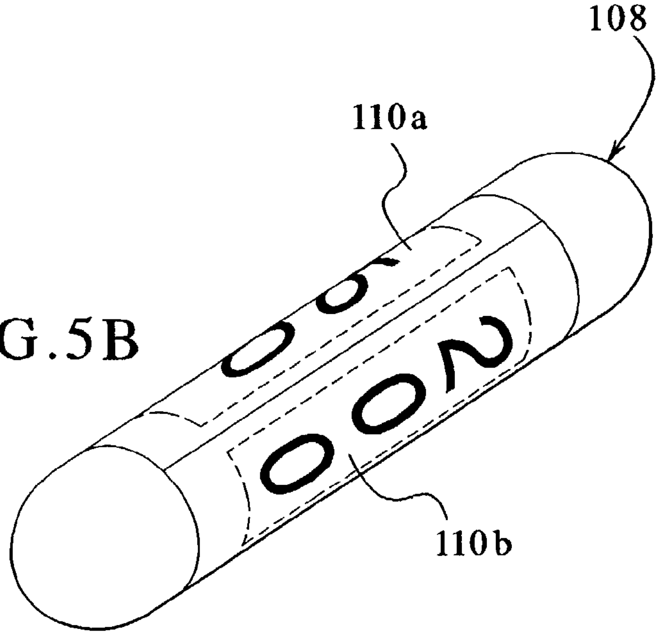
FIG. 5B illustrates the award indicator of another embodiment of the present invention where the award indicator includes a plurality of award symbols.
Figure 5C:
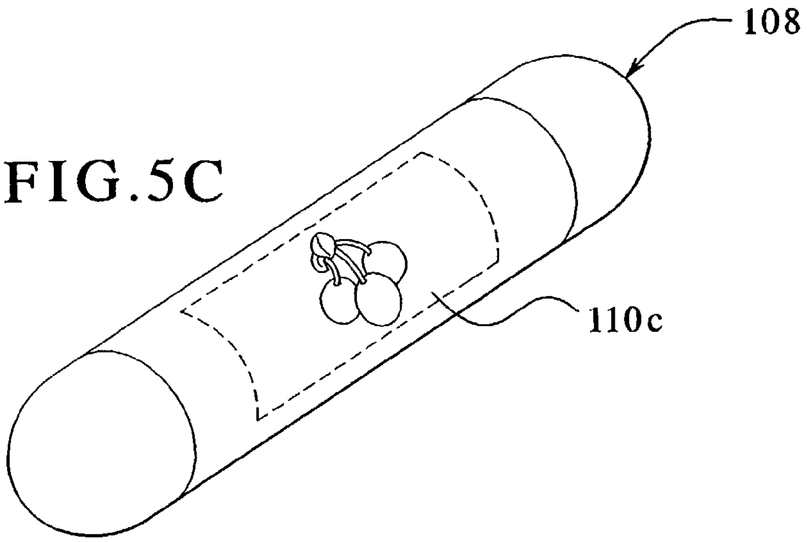
FIG. 5C illustrates the award indicator of another embodiment of the present invention where the award indicator includes a game element.

Referring to FIGS. 5A, 5B and 5C, three embodiments of the present invention are illustrated where the tubular member 108 includes one or more symbols. In FIG. 5A, the tubular member includes one award symbol 110 which has an associated award of fifty. As described above, the award symbols 110 may represent any types of suitable awards as desired by the game implementor. In FIG. 5B, the tubular member 108 includes multiple award symbols such as award symbols 110*a* and 110*b*. Again, the award symbols 110*a* and 110*b* include associated awards of fifty and two hundred, respectively. It should be appreciated that the tubular members 108 may include any number or types of symbols such as awards as desired by the game implementor.

Referring to FIG. 5C, a further embodiment of the tubular member 108 is illustrated where the tubular member 108 includes a symbol such as game element 110*c*. In this embodiment, the symbol or game element 110*c* provides a function in a game or games. For example, the game element 110*c* may be an additional symbol to a combination of symbols indicated on a plurality of reels. It should also be appreciated that the tubular members may include any suitable symbol or symbols.

The indicator display 100 may be employed in a primary game, bonus game, or other type of game to reveal and indicate awards to a player based upon one or more award triggering events. In one embodiment, the tubular members 108 are manufactured to correspond to the theme of a game. As shown in FIGS. 1A through 5B, the tubular members 108 are shaped like "hot dogs," which may be used in conjunction with a game that includes a theme related to a barbecue or a hot dog roast. It should be appreciated that the tubular members may be used in conjunction with any suitable game theme as desired by the game manufacturer.

In a further embodiment, a selector (not shown) is associated with each of the tubular members in the indicator display. The selector enables a player to choose and active one or more of the tubular members in a game. The gaming device then provides the player with the symbol associated with the tubular member or members picked by the player. Additionally in the game, the gaming device may simultaneously, sequentially or randomly rotate the activated tubular members or any combination therein.

While the present invention is described in connection with what is presently considered to be the preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a cabinet;

a support connected to the cabinet, said support defining a plurality of substantially concave channels;

a base game operable upon a wager by a player and including a plurality of reels;

a bonus game including a plurality of elongated tubular members each positioned in a different one of said substantially concave channels, each tubular member having substantially semispherical ends and having a length greater than a diameter of said tubular member, each tubular member movably connected to the support, and each tubular member rotatable about a different non-horizontal axis, the length of each tubular member measured from exterior ends of the tubular member along the axis of rotation; and a symbol displayed to the player by moving at least one of the tubular members after a triggering event occurs in the base game.

2. The gaming device of claim 1, which includes a housing connected to the cabinet, wherein said housing encloses the support.

3. The gaming device of claim 2, wherein the housing is partially transparent.

4. The gaming device of claim 1, wherein the support defines at least one channel.

5. The gaming device of claim 4, wherein the channel defines a concave surface.

6. The gaming device of claim 1, wherein the support includes a plurality of partitions, said partitions positioned between each of the channels.

7. The gaming device of claim 6, wherein the partitions are integrally formed with the support.

8. The gaming device of claim 1, wherein each of the tubular members includes a plurality of different symbols.

9. The gaming device of claim 1, wherein at least one of the tubular members includes a plurality of different symbols.

10. The gaming device of claim 1, wherein the symbol is an award symbol.

11. A gaming device comprising:

a cabinet;

a housing connected to the cabinet;

a support mounted in the housing, said support defining a plurality of substantially concave channels;

a base game operable upon a wager by a player and including a plurality of reels;

a bonus game including a plurality of elongated tubular members each positioned in a different one of said substantially concave channels, each tubular member having substantially semispherical ends and having a length greater than a diameter of said tubular member, each tubular member movably connected to the support, and each tubular member rotatable about a different non-horizontal axis, the length of each tubular member measured from exterior ends of the tubular member along each axis of rotation; and a symbol displayed to a player by moving at least one of the tubular members after a triggering event occurs in the base game.

12. The gaming device of claim 11, wherein the housing is transparent.

13. The gaming device of claim 11, wherein the support defines at least one channel.

14. The gaming device of claim 13, wherein the channel defines a concave surface.

15. The gaming device of claim 14, wherein the support includes a plurality of partitions, said partitions positioned between each of the channels.

16. The gaming device of claim 11, wherein each of the tubular members includes a plurality of different symbols.

17. The gaming device of claim 11, wherein at least one of the tubular members includes a plurality of different symbols.

18. The gaming device of claim 11, wherein the symbol is an award symbol.

19. A gaming device comprising:

a cabinet;

a housing connected to the cabinet;

a base game operable upon a wager by a player and including a plurality of reels;

a support connected to the housing, said support defining a plurality of channels each having an area defined by a concave surface;

a bonus game including a plurality of elongated tubular members, each having substantially semispherical ends and having a length greater than a diameter, rotatably connected to the support, and positioned in the areas defined by the concave surfaces of the channels defined by the support, wherein each of the tubular members are rotatable about a different non-horizontal axis, the length measured from exterior ends of the tubular members along the axis of rotation; and at least one award symbol on each tubular member, wherein one of the award symbols is displayed to the player by rotating one of the tubular members in said channels after a triggering event occurs in the base game.

20. The gaming device of claim 19, wherein each of the tubular members includes a plurality of different symbols.

21. A gaming device comprising:

a cabinet;

a support connected to the cabinet, wherein the support defines a plurality of substantiality concave channels;

a plurality of elongated tubular members each positioned in a different one of said substantially concave channels, each tubular member having substantially semispherical ends and having a length greater that a diameter of said tubular member, positioned in the channels, each tubular member rotatably connected to the support, wherein each of the tubular members are rotatable about a different non-horizontal axis, the length of each tubular member measured from exterior ends of the tubular member along the axis of rotation;

a base wagering game operable upon a wager by a player, said base wagering game including a plurality of reels; and a bonus game operable upon a triggering event in the base wagering game, wherein an award provided to the player in the bonus game is at least partially displayed to the player by rotating at least one of the tubular members.

22. The gaming device of claim 21, wherein each of the tubular members includes a plurality of different symbols.

23. The gaming device of claim 21, wherein at least one of the tubular members includes a plurality of different symbols.

24. A gaming device comprising:

a cabinet;

a housing connected to the cabinet;

a support connected to the housing, said support including a plurality of channels, wherein the channels define concave surfaces, and a plurality of partitions are positioned between each of the channels;

a base wagering game operable upon a wager by a player, said base wagering game including a plurality of reels;

a bonus game including a plurality of elongated tubular members, at least one tubular member having substantially semispherical ends and having a length greater than a diameter of said tubular member, said tubular members rotatably connected to the support and positioned in the channels, said tubular members each including at least one symbol, wherein each of the tubular members includes a different symbol, wherein each of the tubular members are rotatable about a different non-horizontal axis, the length of each tubular member measured from exterior ends of the tubular member along each axis of rotation; and a processor which causes at least one of the tubular members to rotate to reveal the symbol on said tubular member after an award triggering event occurs in the base wagering game.

25. A method of operating a gaming device including a cabinet, a support connected to the cabinet, wherein the support defines a plurality of substantially concave channels, and a plurality of tubular members each positioned in a different one of said substantially concave channels, said method comprising the steps of:

(a) initiating a base wagering game, wherein the base wagering game includes a plurality of reels; and (b) rotating about a non-horizontal axis at least one of the plurality of tubular members to reveal a symbol on the tubular member after a triggering event occurs in the base wagering game, wherein each of said plurality of tubular members have substantially semispherical ends and have a length greater than a diameter of said tubular member, and each tubular member is rotatable about a different non-horizontal axis, the length of each tubular member measured from exterior ends of the tubular member along each axis of rotation.

26. The method of claim 25, which includes the step of rotating the tubular members to reveal different award symbols included on each of the tubular members.

27. The method of claim 25, which includes the step of incrementally rotating at least one of the tubular members to reveal different symbols included on said tubular member.

28. The method of claim 25, which includes the step of rotating the tubular members sequentially to reveal the symbols on the tubular members.

29. The method of claim 25, which includes the step of rotating the tubular members simultaneously to reveal the symbols on the tubular members.

30. The method of claim 25, which includes the step of rotating the tubular members according to at least one of the methods consisting of: sequentially rotating the tubular members, simultaneously rotating the tubular members and incrementally rotating the tubular members.

31. A gaming device comprising:

a cabinet;

at least one display device supported by the cabinet and configured to display a base game operable upon a wager by a player; and a bonus game display device supported by the cabinet, said base game display device including a plurality of elongated hot dog shaped tubular members, each tubular member:

(a) rotatably positioned in a different substantially concave channel, (b) rotatable about a different non-horizontal axis, (c) having a length greater than a diameter of said tubular member, said length measured from exterior ends of said tubular member along the axis of rotation, (d) having substantially spherical shaped ends; and (e) having at least one symbol displayable to the player by rotating said tubular member.

* * * * *

UNITED STATES PATENT AND TRADEMARK OFFICE

CERTIFICATE OF CORRECTION

PATENT NO. : 7,614,950 B2
APPLICATION NO. : 10/364216
DATED : November 10, 2009
INVENTOR(S) : Markus Rothkranz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 783 days.

Signed and Sealed this

Fourteenth Day of December, 2010

David J. Kappos

David J. Kappos
*Director of the United States Patent and Trademark Office*